US012058962B2

(12) United States Patent
Peterson (10) Patent No.: US 12,058,962 B2
(45) Date of Patent: Aug. 13, 2024

(54) BELT TENSION LOCKOUT DEVICE FOR AN AGRICULTURAL BALER

(71) Applicant: CNH Industrial America LLC, New Holland, PA (US)

(72) Inventor: Charles Brandon Peterson, West Grove, PA (US)

(73) Assignee: CNH Industrial America LLC, New Holland, PA (US)

( * ) Notice: Subject to any disclaimer, the term of this patent is extended or adjusted under 35 U.S.C. 154(b) by 765 days.

(21) Appl. No.: 17/188,386

(22) Filed: Mar. 1, 2021

(65) Prior Publication Data

US 2021/0267128 A1    Sep. 2, 2021

Related U.S. Application Data

(60) Provisional application No. 62/982,869, filed on Feb. 28, 2020.

(51) Int. Cl.
| | |
|---|---|
| *A01F 15/07* | (2006.01) |
| *A01F 15/18* | (2006.01) |
| *A01F 15/08* | (2006.01) |
| *A01F 15/10* | (2006.01) |

(52) U.S. Cl.
CPC ............ *A01F 15/07* (2013.01); *A01F 15/18* (2013.01); *A01F 15/0715* (2013.01); *A01F 2015/0785* (2013.01); *A01F 15/085* (2013.01); *A01F 15/0883* (2013.01); *A01F 15/101* (2013.01)

(58) Field of Classification Search
CPC ...... A01F 15/07; A01F 15/18; A01F 15/0715; A01F 15/085; A01F 15/0883; A01F 15/101; A01F 2015/0785
See application file for complete search history.

(56) References Cited

U.S. PATENT DOCUMENTS

| | | | | |
|---|---|---|---|---|
| 2,953,083 | A * | 9/1960 | McDuffie | A01F 15/101 100/189 |
| 4,244,167 | A * | 1/1981 | Seefeld | A01F 15/07 100/88 |
| 4,702,066 | A * | 10/1987 | Newendorp | A01F 15/0833 100/88 |
| 4,768,431 | A * | 9/1988 | Merritt, III | A01F 15/0715 100/88 |
| 5,605,095 | A * | 2/1997 | McClure | A01F 15/0833 100/88 |

(Continued)

FOREIGN PATENT DOCUMENTS

| | | | | |
|---|---|---|---|---|
| DE | 3941707 A1 * | 6/1991 | ......... | A01F 15/0833 |
| DE | 102017122138 A1 * | 3/2019 | ......... | A01F 15/0715 |

(Continued)

*Primary Examiner* — Arpad Fabian-Kovacs
(74) *Attorney, Agent, or Firm* — Peter K. Zacharias; Rebecca L. Henkel; Rickard K. DeMille (57) ABSTRACT

A lockout device for a round baler. The lockout device has a body configured for being connected to a side of the tailgate of the round baler, a handle pivotally connected to the body at a pivot point, a wedge pivotally connected to the body at the same pivot point, and a biasing member connected in between the handle and the wedge. The handle is configured for pivoting in between a closed position and an open position for pivoting the wedge to be at least partially within the bale chamber to lock out the bale chamber.

20 Claims, 8 Drawing Sheets

(56) References Cited

U.S. PATENT DOCUMENTS

| | | | |
|---|---|---|---|
| 6,941,740 B2 | 9/2005 | Fox et al. | |
| 10,194,595 B2 | 2/2019 | Smith | |
| 11,140,831 B2 * | 10/2021 | Kappelman | A01F 15/0715 |
| 2012/0103208 A1 * | 5/2012 | Jahraus | A01F 15/085 |
| | | | 100/88 |
| 2013/0298787 A1 * | 11/2013 | Simmons | A01F 15/18 |
| | | | 100/76 |
| 2018/0310482 A1 * | 11/2018 | Reijersen Van Buuren | |
| | | | A01F 15/0715 |
| 2021/0212261 A1 * | 7/2021 | De Baere | A01F 15/0833 |
| 2022/0015300 A1 * | 1/2022 | Derscheid | A01F 15/07 |

FOREIGN PATENT DOCUMENTS

| | | | | |
|---|---|---|---|---|
| EP | 0293025 A1 | | 11/1988 | |
| EP | 1588603 A1 * | | 10/2005 | A01F 15/0833 |
| EP | 2742795 A2 * | | 6/2014 | A01F 15/07 |
| EP | 3459340 A1 | | 3/2019 | |
| FR | 2509120 A1 * | | 1/1983 | A01F 15/0883 |

* cited by examiner

BELT TENSION LOCKOUT DEVICE FOR AN AGRICULTURAL BALER

BACKGROUND OF THE INVENTION

The present invention pertains to agricultural balers and, more specifically, to a mechanism to lock out belt tension on a variable bale chamber of an agricultural round baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable by a take-up or serpentine arm so that the chamber can initially contract and subsequently expand to maintain an appropriate amount of pressure on the periphery of the bale. To maintain the pressure on the bale, the carrier elements are generally held under constant tension by one or more biasing members and/or actuators. After the bale is formed and wrapped by the wrapping mechanism, the rear, i.e., tailgate, of the baler is opened to discharge the bale onto the field.

Generally, to service or repair the bale chamber of the round baler, an operator must de-tension the carrier elements, i.e., belts. Typically, round balers include a mechanism to de-tension and immobilize the belts. For example, the mechanism may be in the form of a physical stop on the belt serpentine arm. In such a configuration, the operator must generally open the tailgate and use a long, bent rod to manually insert or retract a mechanical stop that prevents the movement of the serpentine arm. As can be appreciated, manually actuating the mechanical stop can be time-consuming and cumbersome.

What is needed in the art is a mechanism to efficiently de-tension and lock out the belts of the round baler.

SUMMARY OF THE INVENTION

In one exemplary embodiment formed in accordance with the present invention, there is provided an over-center lockout device of a round baler for locking out and de-tensioning the belts of the bale chamber. The lockout device includes a body, a handle, a wedge, and a single biasing member connected in between the handle and the wedge. The biasing force of the biasing member moves the wedge into and out of the bale chamber upon actuation of the handle.

In another exemplary embodiment formed in accordance with the present invention, there is provided a lockout device for a round baler. The round baler has a bale chamber and a tailgate. The lockout device has a body configured for being connected to a side of the tailgate, a handle pivotally connected to the body at a pivot point, a wedge pivotally connected to the body at the same pivot point, and a biasing member connected in between the handle and the wedge. The handle is configured for pivoting in between a closed position and an open position for pivoting the wedge to be at least partially within the bale chamber to lock out the bale chamber.

In yet another exemplary embodiment formed in accordance with the present invention, there is provided a round baler that includes a frame and a bale chamber configured for forming bales therein. The bale chamber has a plurality of rollers and at least one belt supported by the plurality of rollers. The round baler further includes a support arm movably connected in between the frame and at least one roller of the plurality of rollers and a tailgate pivotally connected to the frame. The tailgate has a side panel with a slot therein. The round baler further includes a lockout device configured for selectively locking out the bale chamber by preventing a movement of the support arm. The lockout device includes a body connected to the side panel of the tailgate, a handle pivotally connected to the body at a pivot point, a wedge pivotally connected to the body at the same pivot point, and a biasing member connected in between the handle and the wedge. The handle is configured for pivoting in between a closed position and an open position for pivoting the wedge at least partially through the slot in the side panel of the tailgate so that the wedge locks out the bale chamber by engaging with the support arm and preventing the movement thereof for de-tensioning the at least one belt.

In yet another exemplary embodiment formed in accordance with the present invention, there is provided a method for operating a round baler. The round baler has a bale chamber with at least one belt, a support arm, and a tailgate. The method includes an initial step of providing a lockout device for the round baler. The lockout device includes a body configured for being connected to a side of the tailgate, a handle pivotally connected to the body at a pivot point, a wedge pivotally connected to the body at the same pivot point, and a single biasing member connected in between the handle and the wedge. The method includes a step of pivoting the handle from a closed position to an open position wherein a biasing force of the biasing member automatically pivots the wedge such that the wedge at least partially extends into the bale chamber. The method further includes the steps of raising the tailgate for allowing the support arm to slide past the wedge and lowering the tailgate for allowing the support arm to abut the wedge such that the wedge prevents a movement thereof for de-tensioning the at least one belt.

One possible advantage of the exemplary embodiment of the agricultural vehicle is that the lockout device allows the operator of the baler to easily and efficiently de-tension the belts of the baler without needing to manually engage or disengage a mechanical stop on the serpentine arm of the baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
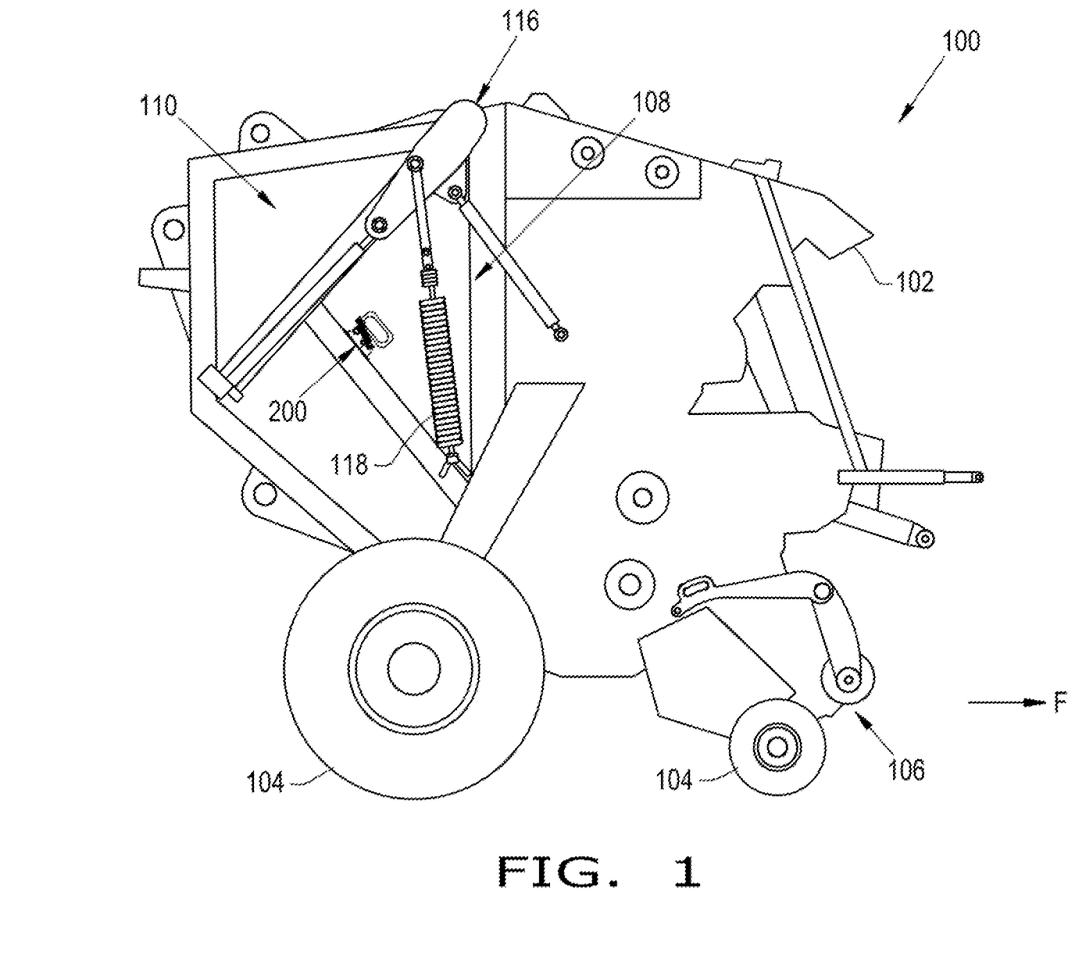
FIG. 1 illustrates a side cross-sectional view of an agricultural baler, the agricultural baler having bale chamber and a belt tension lockout device, in accordance with an exemplary embodiment of the present invention.
Figure 2:
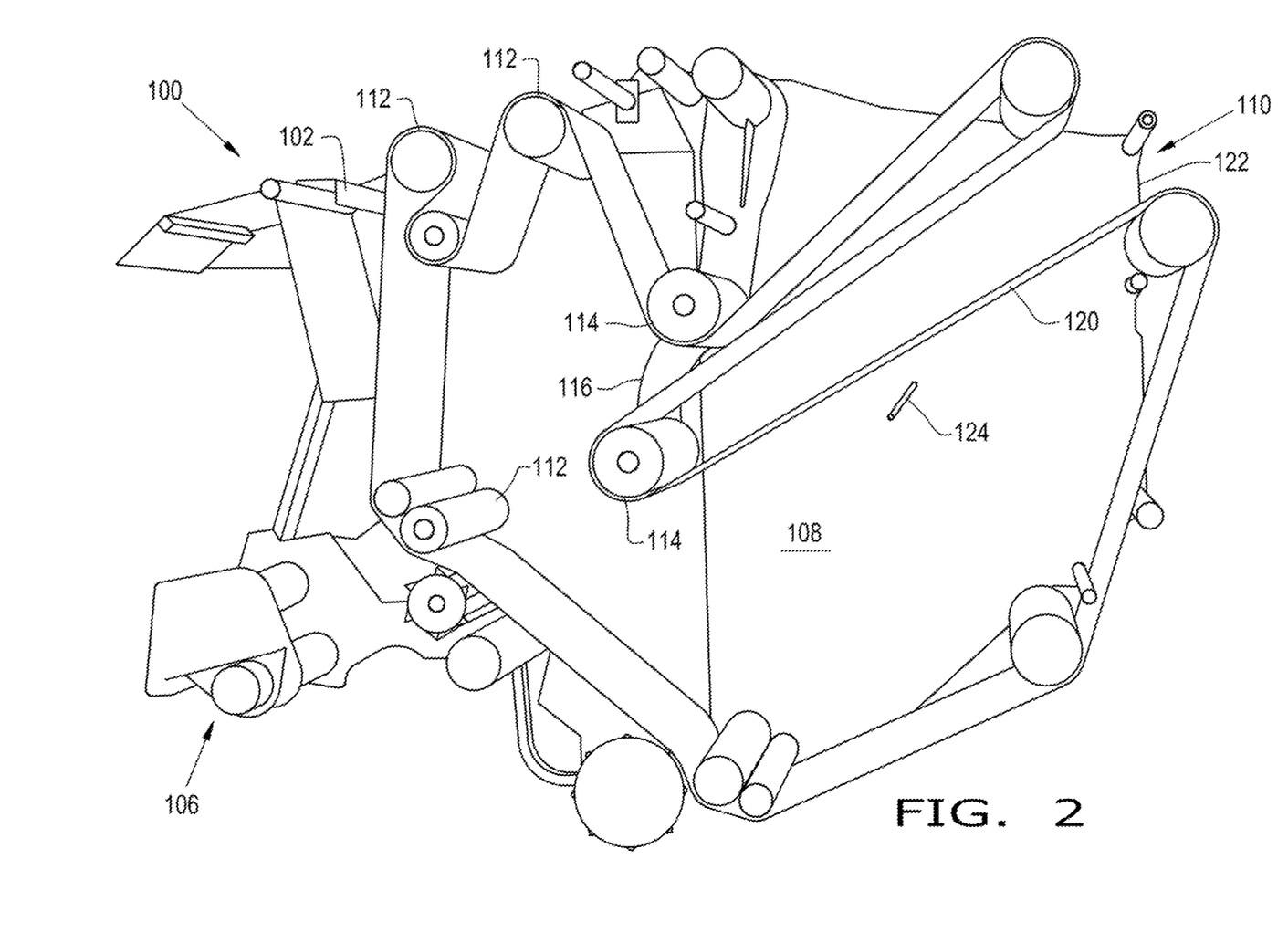
FIG. 2 illustrates a side perspective view of the inside of the bale chamber of the agricultural baler of FIG. 1.

Referring now to the drawings, and more particularly to FIGS. 1-2, there is shown a cross-sectional, side view of a round baler 100 which may be towed by a vehicle in a forward direction of travel F. The vehicle may be any desired vehicle, such as an agricultural vehicle in the form of a tractor. The round baler 100 generally includes a main frame 102, wheels 104 supporting the frame 102, a pickup unit 106 for picking up the crop from the field, a variable bale chamber 108 for forming the bale, and a tailgate 110 for discharging the bale onto the field.

The bale chamber 108 is located rearwardly of the pickup unknit 104. The bale chamber 108 generally includes multiple rollers, such as various stationary rollers 112 and movable rollers 114 mounted on serpentine support arms 116, actuators (unnumbered), tensioners 118, e.g. biasing members 118, and at least one belt 120. The rollers 112, 114 may comprise a floor roller, starter roller, fixed roller(s), pivot roller(s), stripper roller, and/or follower roller(s). Together, the rollers 112, 114 and the belt(s) 120 create a round circulating chamber which expands in between an empty bale position and a full bale position for engaging and rolling the bale. As the bale grows inside the chamber 108 it begins to act upon each belt 120 such that each belt 120 pulls against the serpentine arms 116, which in turn causes the movable rollers 114 to move upwardly so that the variable bale chamber 108 incrementally expands with the size of the bale. The serpentine arms 116 may mount multiple movable rollers 114. Each serpentine arm 116 may be pivotally connected to the frame 102. Each serpentine arm 116 may comprise any desired shape.

When the bale reaches a predetermined size, the bale is wrapped with a wrapping material (e.g., mesh or twine) by a wrapper. Then, once fully wrapped, the bale is ejected out of the tailgate 110. The tailgate 110 is pivotally connected to the frame 102 so that when the bale is fully wrapped the tailgate 110 may pivot upwardly to open the bale chamber 108 and allow bale to roll out of the bale chamber 108. The bale may roll out of the bale chamber 108 and onto a bale ejector or kicker (not shown), which pushes the bale rearwardly away from the baler 100 so that the tailgate 110 may downwardly pivot unencumbered by the ejected bale.

Referring now collectively to FIGS. 1-4, the baler 100 may additionally include a lockout device 200, i.e., over-center lockout mechanism 200, for selectively locking out the bale chamber 108 by preventing a movement of the serpentine arm(s) 116. The lockout device 200 is connected to a side panel 122 of the tailgate 110. The lockout device 200 generally includes a mounting plate 202, a body 204 connected to the side panel 122 via the mounting plate 202, a handle 206 pivotally connected to the body 204, a pawl or wedge 208 pivotally connected to the body 204, and a biasing member 210 connected in between the handle 206 and the wedge 208. The handle 206 is pivotable between a closed position (FIG. 3) and an open position (FIG. 4) for pivoting the wedge 208 at least partially through the slot 124 in the side panel 122 so that the wedge 208 locks out the bale chamber 108 by engaging with the serpentine arm(s) 116 and preventing the movement thereof for de-tensioning the belt(s) 120. As used herein, the phrase locking out the bale chamber 108 may refer to the process of selectively immobilizing at least one serpentine arm 116 in order to de-tension the belt(s) 120 upon raising and then subsequently lowering the tailgate 110. As can be appreciated, once each belt 120 is de-tensioned the operator may perform the desired maintenance of the bale chamber 108. Thereby, the operator may easily and efficiently lock out the bale chamber 108 without needing to enter and exit the cab of the work vehicle multiple times or tediously and manually (dis)engage a mechanical stop.

Figure 3:
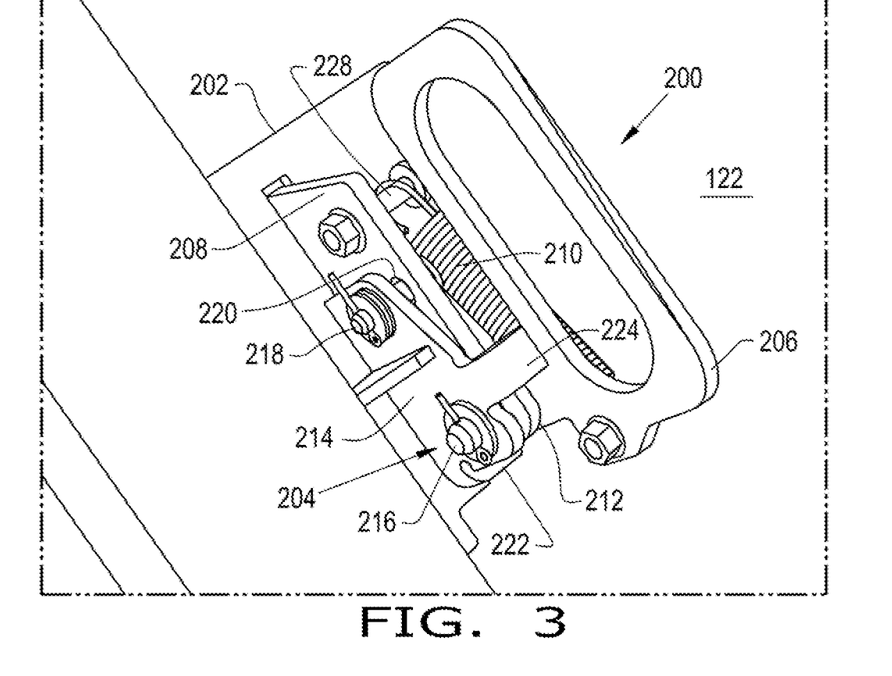
FIG. 3 illustrates a perspective view of the belt tension lockout device in a closed position.
Figure 4:
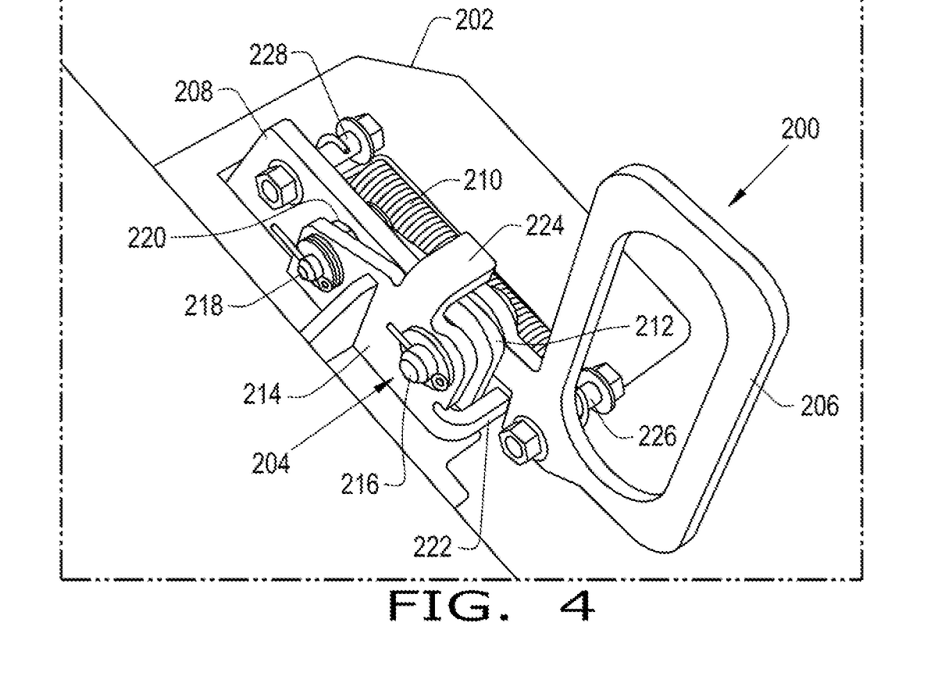
FIG. 4 illustrates a perspective view of the belt tension lockout device in an open position.

The mounting plate 202 attaches the body 204 to the side panel 122. The mounting plate 202 may have a slot therein for allowing the wedge 208 to selectively pass therethrough. The mounting plate 202 may be welded and/or fastened to the side panel 122. The mounting plate 202 may comprise any desired shape and material. It should be appreciated that the lockout device 200 may not include a mounting plate 202.

The body 204 includes a first, front plate 212 and a second, rear plate 214. The plates 212, 214 are juxtaposed and substantially parallel to one another. The plates 212, 214 may be welded and/or fastened to the mounting plate 202. The plates 212, 214 are connected to one another by a pivot pin 216 which is transversely connected in between the plates 212, 214. The pivot pin 216 also pivotally mounts both of the handle 206 and the wedge 208. In more detail, the handle 206 is mounted on the pivot pin 216 at the front plate 212, and the wedge 208 is mounted on the pivot pin 216 in between the front and rear plates 212, 214. Hence, the pivot pin 216 defines the pivot point about which the handle 206 and the wedge 208 pivot. The body 204 further includes a wedge guide pin 218 that interfaces with a corresponding slot 220 in the wedge 208 for guiding a rotational movement of the wedge 208 relative to the body 204. The rear plate 214 of the body 204 has at least one mechanical stop 222, 224 for abutting against and stopping a rotational movement of the handle 206. For instance, the rear plate 214 may have a lower mechanical stop 222 and an upper mechanical stop 224 for bounding the movement of the handle 206. In this regard, the handle 206 may contact the upper mechanical stop 224 in the closed position (FIG. 3) and the lower mechanical stop 222 in the open position (FIG. 4). The body 204 may comprise any desired material, such as metal.

The handle 206 is pivotally connected to the body 204 via the pivot pin 216. The handle pivots in between the closed position, wherein the handle 206 rests horizontally against the body 204, and the open position, wherein the handle 206 is vertically disposed in front of the body 204. The handle 206 may be in the form of a rectangular plate with a cutout therein for allowing the user's hand to easily manipulate the handle 206. However, the handle 206 may comprise any desired shape. Also, the handle 206 may comprise any desired material, such as metal.

The wedge 208 is pivotally connected in between the plates 212, 214 of the body 204 at the pivot point defined by the pivot pin 216. Hence, the wedge 208 and the handle 206 are both mounted on and pivot about the same pivot point. The wedge 208 may translate, via the biasing force of the biasing member 210, relative to the body 204 such that the wedge 208 at least partially extends into or out of the bale chamber 108. The slot 220 receives and interfaces with the wedge guide pin 218 for bounding the movement of the wedge 208. The slot 220 may have an arcuate cross-sectional shape. The wedge 208 may comprise any desired shape and material.

Figure 5:
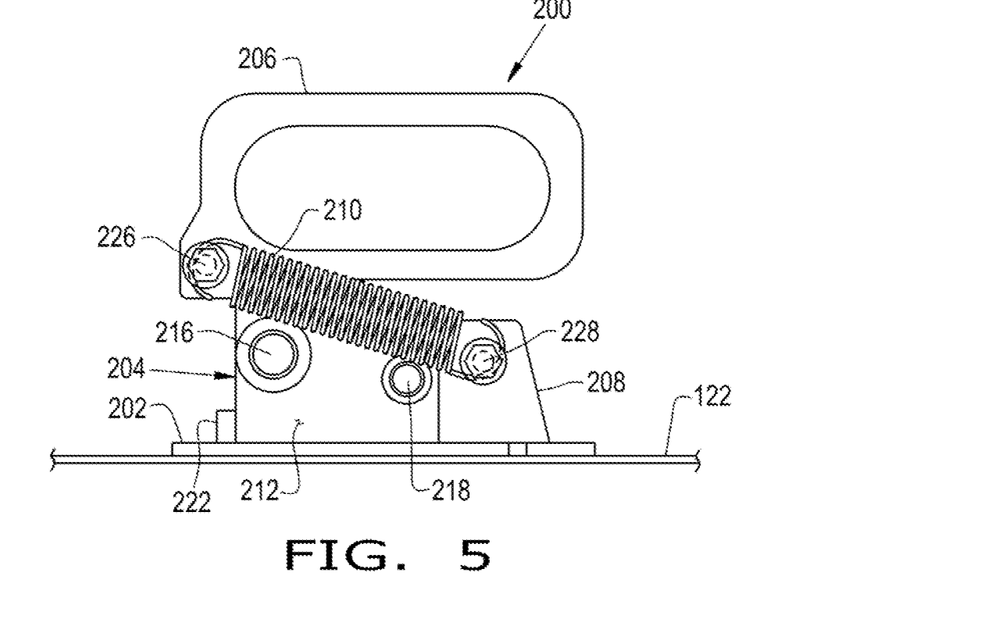
FIG. 5 illustrates a side view of the belt tension lockout device in the closed position.
Figure 6:
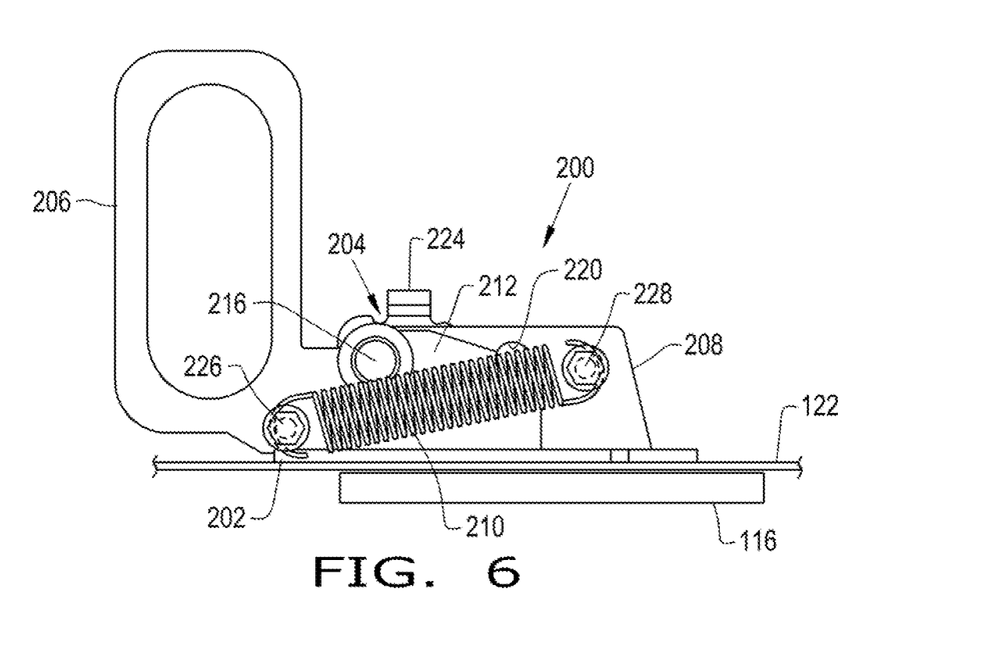
FIG. 6 illustrates a side view of the belt tension lockout device in the open position, wherein the serpentine arm slides past the belt tension lockout device.

The biasing member 210 is connected in between the handle 206 and the wedge 208. More particularly, the biasing member 210 is connected to the handle 206 at a first location, i.e., first fixation member 226, which is located forwardly of the pivot point defined by the pivot pin 216, and the biasing member 210 is connected to the wedge 208 at a second location, i.e., second fixation member 228, which is located rearwardly of the pivot point defined by the pivot pin 216. The first location is adjacent to the front of the handle 206 such that the first location moves to be above the pivot point defined by the pivot pin 216 in the closed position of the handle 206 (FIGS. 3 and 5) and below the pivot point in the open position of the handle 206 (FIGS. 4 and 6). As can be appreciated, the fixation members 226, 228 may be in the form of bolts 226, 228 connected to and extending outwardly from the handle 206 and the wedge 208, respectively. The biasing member 210 is the only biasing member 210 connected in between the handle 206 and the wedge 208. In other words, the lockout device 200 only includes a single biasing member 210 and does not include two or more biasing members. Hence, the biasing member 210 is the only biasing member 210 acting on the wedge 208. Thus, the over-center configuration of the handle 206 allows the biasing member 210 to dually and automatically move the wedge 208 upwardly and out of the bale chamber 108 in the closed position of the handle 206 and downwardly and into the bale chamber 108 in the open position of the handle 206. The biasing member 210 may be in the form of a coil spring 210.

Figure 9:
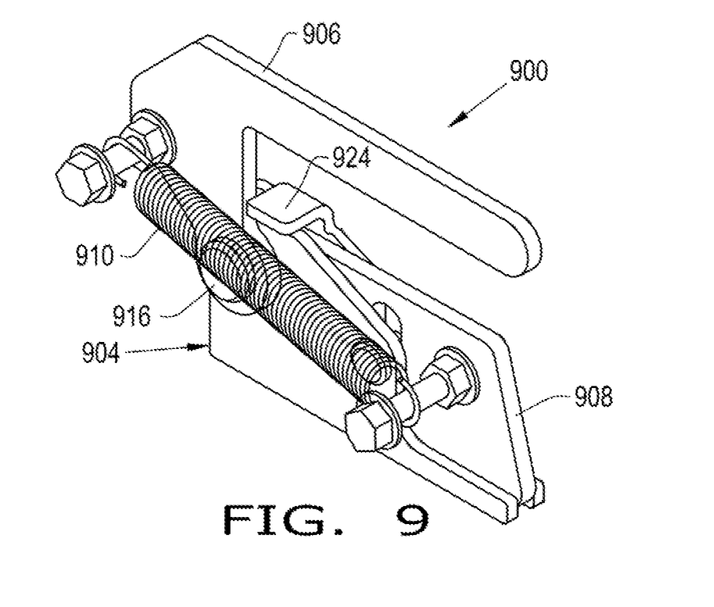
FIG. 9 illustrates a perspective view of another embodiment of a belt tension lockout device, in accordance with an exemplary embodiment of the present invention.
Figure 10:
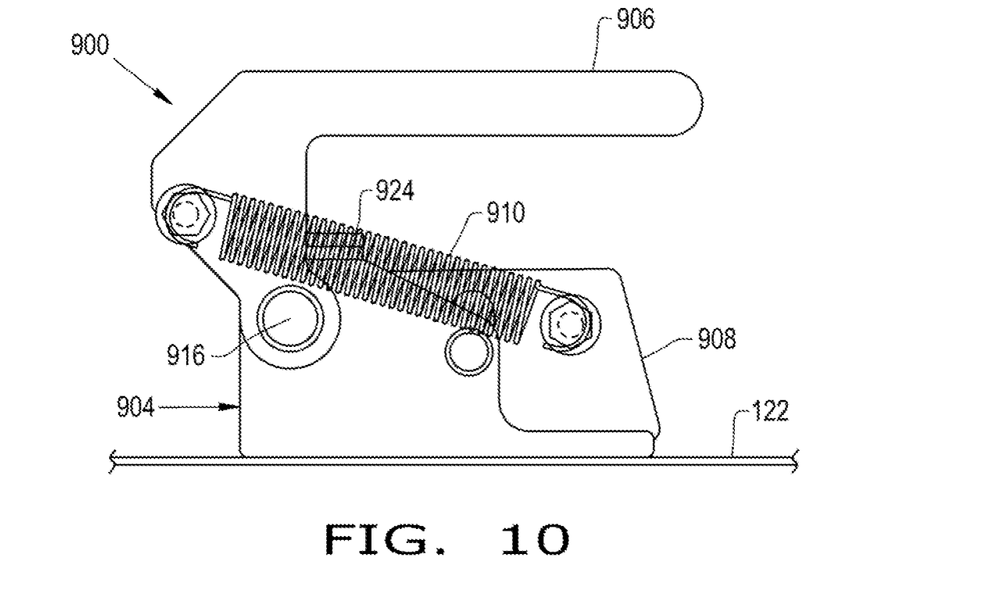
FIG. 10 illustrates a side view of the belt tension lockout device of FIG. 9 in the closed position.
Figure 11:
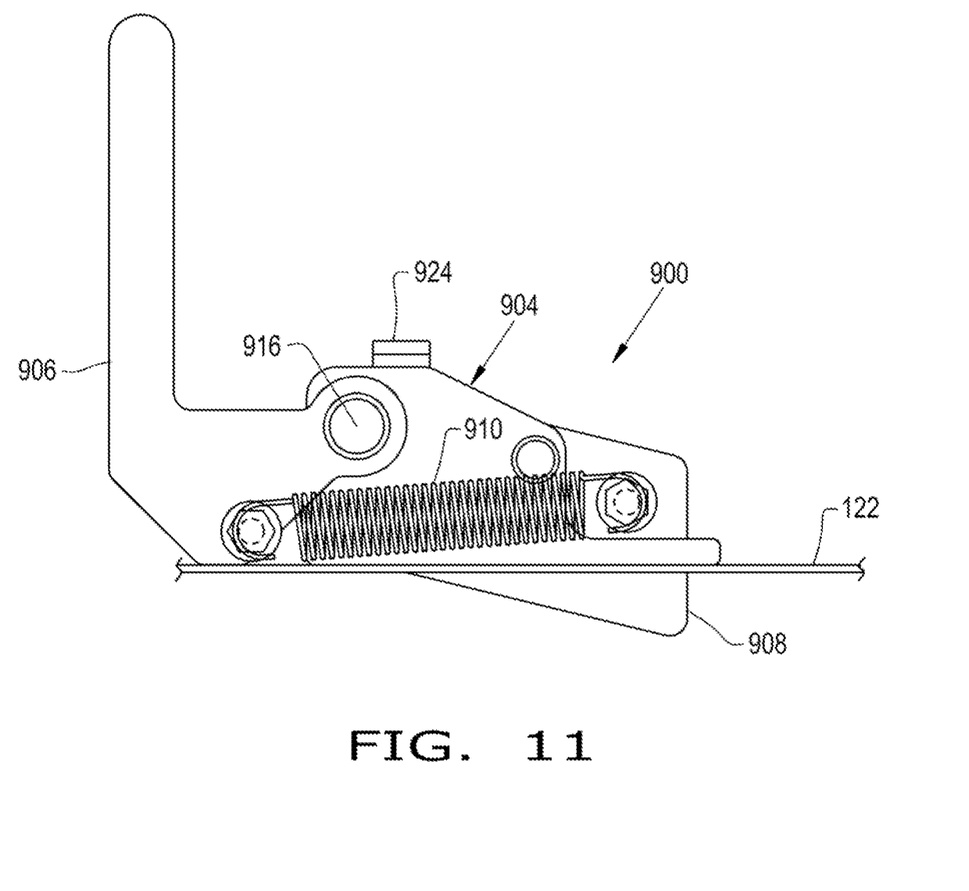
FIG. 11 illustrates a side view of the belt tension lockout device of FIG. 9 in the open position.

Referring now to FIGS. 9-11, there is shown another exemplary embodiment of a lockout device 900 which may be substantially similar to the lockout device 200, except that the lockout device 900 has a handle 906 which directly interfaces with the side panel 122 of the tailgate 110 in the open position of the handle 906. Thereby, the lockout device 900 does not include a mounting plate 202 or a lower mechanical stop 222. The lockout device 900 may generally include a base 904 welded to the side panel 122 of the tailgate 110, a lever-type handle 906, a wedge 908, a biasing member 910, and a pivot pin 916. In the closed position, the handle 906 rests against the upper mechanical stop 924 and the wedge 908 does not extend into the bale chamber 108 (FIG. 10). In the open position, the front of the handle 906 directly abuts the side panel 122 of the tailgate 110 and the wedge 908 extends into the bale chamber 108 (FIG. 11).

Figure 7:
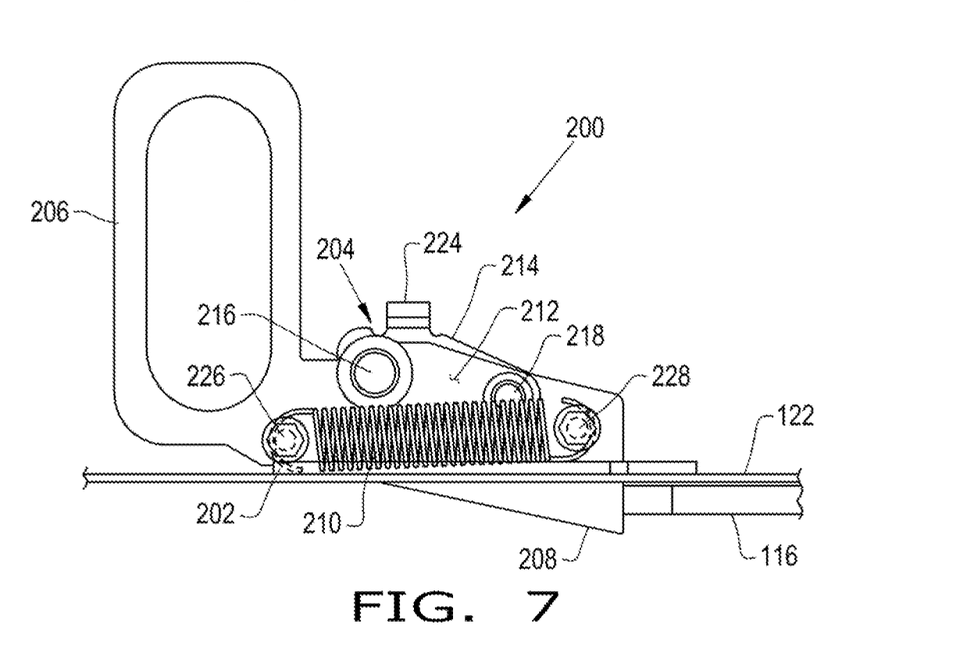
FIG. 7 illustrates a side view of the belt tension lockout device in the open position with the serpentine arm locked out.
Figure 8:
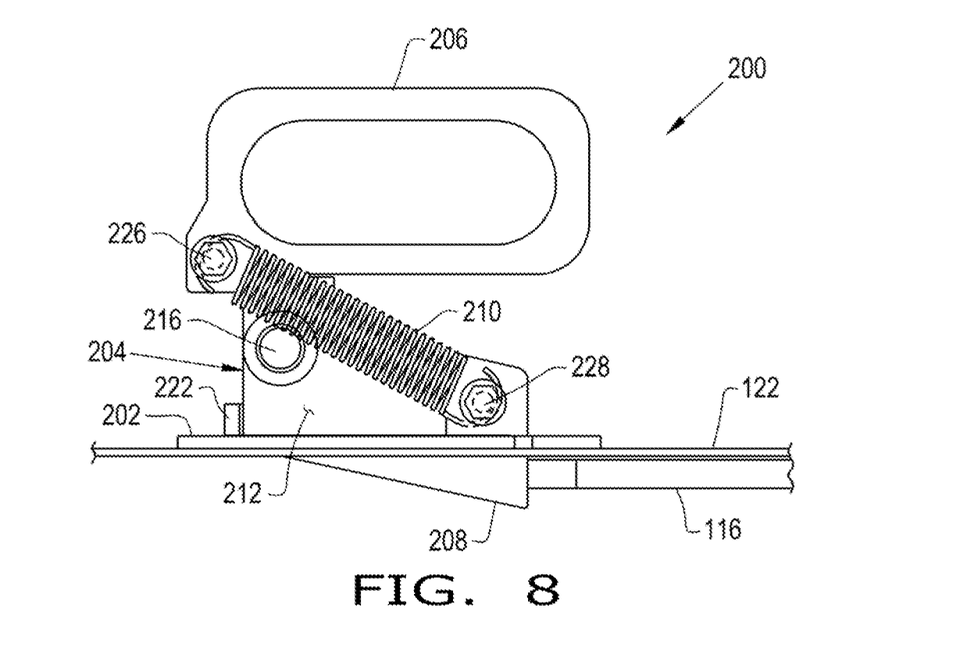
FIG. 8 illustrates a side view of the belt tension lockout device in the closed position with the serpentine arm still locked out.
Figure 12:
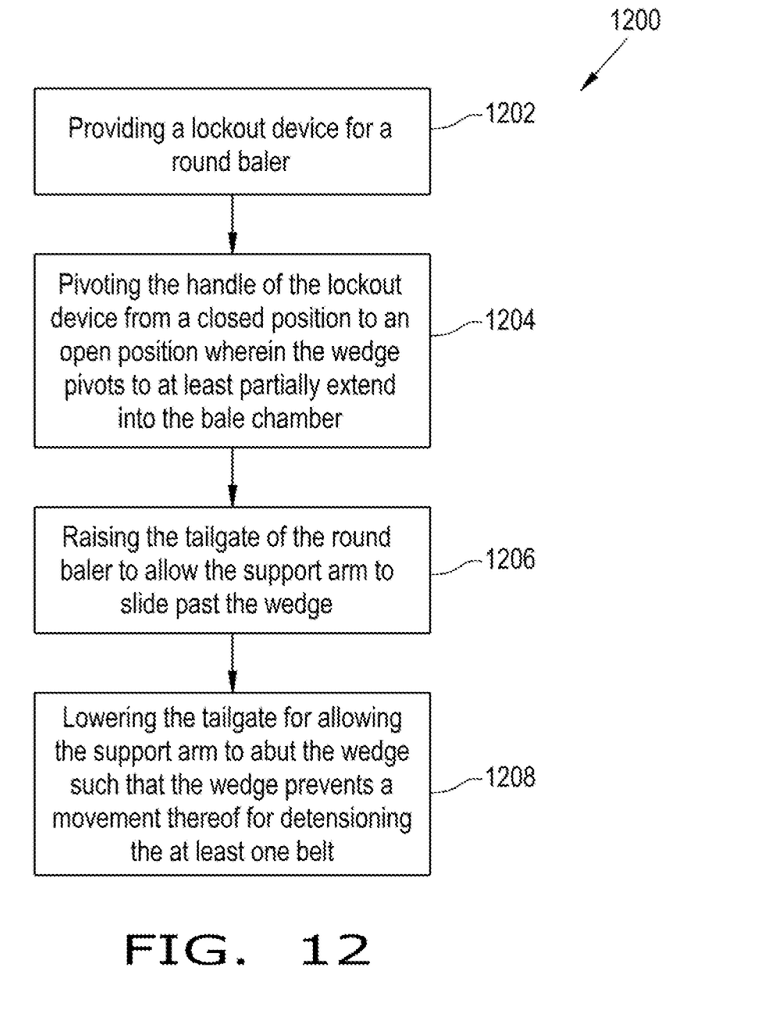
FIG. 12 illustrates a flowchart of a method for operating the belt tension lockout device, in accordance with an exemplary embodiment of the present invention.

Referring now to FIG. 12, there is shown a flowchart of a method 1200 for operating the belt tension lockout device 200 or 900. By way of example only, the method 1200 is described with reference to the lockout device 200. The method 1200 includes an initial step of providing the lockout device 200 (at block 1202). The method 1200 further includes a step of pivoting the handle 206 from the closed position to the open position (at block 1204). In the open position, the biasing force of the biasing member 210 automatically pivots the wedge 208 such that the wedge 208 at least partially extends into the bale chamber 108 (FIGS. 4 and 7). It is noted that the tailgate 110 does not need to be initially raised before positioning the handle 206 in the open position. Then, the tailgate 110 may be raised (at block 1206). As the tailgate 110 is raised, the serpentine arm 116 will engage with the angled portion of the wedge 208, and overcome the biasing force of the biasing member 210 to thus push the wedge 208 upwardly, so that the serpentine arm 116 will slide past the wedge 208 (FIG. 6). Once the serpentine arm 116 slides past the wedge 208, the wedge 208 will again pivot downwardly to extend into the bale chamber 108. Then, the tailgate 110 may be lowered (at block 1208). As the tailgate 110 is lowered, the serpentine arm 116 will engage with the substantially vertical or flat portion of the wedge 208, which thus prevents a movement of the serpentine arm 116 (FIG. 7). Once the serpentine arm 116 is immobilized, further lowering of the tailgate 110 will add slack to, i.e., de-tension, the belt(s) 120. The method 1200 may further include a step of pivoting the handle 206 from the open position to the closed position, wherein the wedge 208 remains engaged with the serpentine arm 116 (FIG. 8). The frictional forces between the serpentine arm 116 and the wedge 208 are stronger than the biasing force of the biasing member 210, which accordingly prevents the wedge 208 from upwardly pivoting to reside outside of the bale chamber 108. Then, the tailgate 110 may be raised so that the serpentine arm 116 will move away from the wedge 208. Once the serpentine arm 116 disengages from the wedge 208, with the handle 206 still in the closed position, the biasing force of the biasing member 210 will automatically pivot the wedge 208 out of the bale chamber 108 (FIG. 5). As can be appreciated, the method may be performed by the operator of the baler 100.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A lockout device for a round baler, the round baler comprising a bale chamber and a tailgate, the lockout device comprising:
    a body configured for being connected to a side of the tailgate;
    a handle pivotally connected to the body at a pivot point;
    a wedge pivotally connected to the body at the same pivot point; and
    a biasing member connected in between the handle and the wedge, wherein the handle is configured for pivoting in between a closed position and an open position for pivoting the wedge to be at least partially within the bale chamber to lock out the bale chamber.

2. The lockout device of claim 1, wherein the biasing member is the only biasing member acting on the wedge.

3. The lockout device of claim 1, wherein the biasing member is connected to the handle at a first location which is located forwardly of the pivot point, and the biasing member is connected to the wedge at a second location which is located rearwardly of the pivot point.

4. The lockout device of claim 3, wherein the first location is adjacent to the front of the handle such that in the closed position of the handle the first location is above the pivot point and in the open position of the handle the first location is below the pivot point.

5. The lockout device of claim 1, wherein the body comprises a first plate and a second plate, and the wedge is located in between the first and second plates.

6. The lockout device of claim 5, further comprising a pivot pin transversely connected in between the first and second plates and defining pivot point such that both of the handle and the wedge pivot about the pivot pin.

7. The lockout device of claim 1, wherein the body comprises a wedge guide pin configured for guiding a rotational movement of the wedge relative to the body.

8. The lockout device of claim 7, wherein the wedge comprises a slot configured for receiving the wedge guide pin.

9. The lockout device of claim 1, wherein the body comprises at least one mechanical stop configured for abutting against and stopping a rotational movement of the handle.

10. A round baler, comprising:
    a frame;
    a bale chamber configured for forming bales therein, the bale chamber comprising a plurality of rollers and at least one belt supported by the plurality of rollers;
    a support arm movably connected in between the frame and at least one roller of the plurality of rollers;
    a tailgate pivotally connected to the frame, the tailgate comprising a side panel with a slot therein; and
    a lockout device configured for selectively locking out the bale chamber by preventing a movement of the support arm, and comprising:
        a body connected to the side panel of the tailgate;
        a handle pivotally connected to the body at a pivot point;
        a wedge pivotally connected to the body at the same pivot point; and
        a biasing member connected in between the handle and the wedge, wherein the handle is configured for pivoting in between a closed position and an open position for pivoting the wedge at least partially through the slot in the side panel of the tailgate so that the wedge locks out the bale chamber by engaging with the support arm and preventing the movement thereof for de-tensioning the at least one belt.

11. The round baler of claim 10, wherein the biasing member is the only biasing member acting on the wedge.

12. The round baler of claim 10, wherein the biasing member is connected to the handle at a first location which is located forwardly of the pivot point, and the biasing member is connected to the wedge at a second location which is located rearwardly of the pivot point.

13. The round baler of claim 12, wherein the first location is adjacent to the front of the handle such that in the closed position of the handle the first location is above the pivot point and in the open position of the handle the first location is below the pivot point.

14. The round baler of claim 10, wherein the body comprises a first plate and a second plate, and the wedge is located in between the first and second plates.

15. The round baler of claim 14, further comprising a pivot pin transversely connected in between the first and second plates and defining pivot point such that both of the handle and the wedge pivot about the pivot pin.

16. The round baler of claim 10, wherein the body comprises a wedge guide pin configured for guiding a rotational movement of the wedge relative to the body.

17. The round baler of claim 16, wherein the wedge comprises a slot configured for receiving the wedge guide pin.

18. The round baler of claim 10, wherein the body comprises at least one mechanical stop configured for abutting against and stopping a rotational movement of the handle.

19. A method for operating a round baler, the round baler comprising a bale chamber having at least one belt, a support arm, and a tailgate, the method comprising:
    providing a lockout device for the round baler comprising a body configured for being connected to a side of the tailgate, a handle pivotally connected to the body at a pivot point, a wedge pivotally connected to the body at the same pivot point, and a single biasing member connected in between the handle and the wedge;
    pivoting the handle from a closed position to an open position wherein a biasing force of the biasing member automatically pivots the wedge such that the wedge at least partially extends into the bale chamber;
    raising the tailgate for allowing the support arm to slide past the wedge; and
    lowering the tailgate for allowing the support arm to abut the wedge such that the wedge prevents a movement thereof for de-tensioning the at least one belt.

20. The method of claim 19, wherein after lowering the tailgate, the method further comprising:
    pivoting the handle from the open position to the closed position, wherein the wedge remains engaged with the support arm; and
    raising the tailgate such that the support arm moves away from the wedge and the biasing force of the biasing member automatically pivots the wedge out of the bale chamber.

* * * * *